(12) United States Patent
Packirisamy et al.

(10) Patent No.: US 6,766,077 B2
(45) Date of Patent: Jul. 20, 2004

(54) PLANAR WAVEGUIDE ECHELLE GRATING DEVICE WITH ASTIGMATIC GRATING FACETS

(75) Inventors: Muthukumaran Packirisamy, Ottawa (CA); Andre Delage, Gloucester (CA)

(73) Assignee: LNL Technologies, Inc., Cambridge, MA (US)

( * ) Notice: Subject to any disclaimer, the term of this patent is extended or adjusted under 35 U.S.C. 154(b) by 135 days.

(21) Appl. No.: 09/986,828

(22) Filed: Nov. 13, 2001

(65) Prior Publication Data

US 2003/0091282 A1 May 15, 2003

(51) Int. Cl.[7] .............................................. G02B 6/34
(52) U.S. Cl. .......................................... 385/37; 385/24
(58) Field of Search .............................. 385/24, 31, 37; 359/571

(56) References Cited

U.S. PATENT DOCUMENTS

| | | | |
|---|---|---|---|
| 4,786,133 A | | 11/1988 | Gidon et al. |
| 5,351,262 A | | 9/1994 | Poguntke et al. |
| 6,011,884 A | | 1/2000 | Dueck et al. |
| 6,067,197 A | * | 5/2000 | Blasiak et al. ............... 359/571 |
| 6,304,692 B1 | * | 10/2001 | Sappey et al. ................. 385/24 |
| 2002/0131708 A1 | * | 9/2002 | He ............................... 385/37 |

FOREIGN PATENT DOCUMENTS

EP    0 250 824 A1    1/1988

OTHER PUBLICATIONS

He et al. "Monolithic Integrated wavelength demultiplexer based on a waveguide rowland circle grating in InGaAsP/InP", Apr. 1998, Journal of lighwave technology, vol. 16, No. 4, pp 631–637.*
Erickson et al. "Using a retro–reflecting echelle grating to improve WDM demux efficiency", Aug. 1997, Digest of the IEEE/LEO Summer topical meeting, pp 82–83.*
Janz et al. "Planar waveguide echelle gratings: an embeddable diffractive element photonic integrated circuits", OFC 2002, Optical fiber communication conference and exhibit, pp 69–70.*

* cited by examiner

Primary Examiner—Ellen E. Kim
(74) Attorney, Agent, or Firm—Marks & Clerk

(57) ABSTRACT

A planar waveguide grating device has a slab waveguide defining an input channel and a plurality of output channels. An echelle grating has a multitude of facets, each of the facets being blazed with respect to a preselected output channel. Each facet has an elliptical curvature so as to be astigmatic with respect to the input channel and the preselected output channel. The echelle grating is preferably based on a Rowland circle design. The astigmatic design of the facets reduces aberrations at high orders.

17 Claims, 6 Drawing Sheets

PLANAR WAVEGUIDE ECHELLE GRATING DEVICE WITH ASTIGMATIC GRATING FACETS

BACKGROUND OF THE INVENTION

1. Field of the Invention

This invention relates to the field of photonics, and in particular to planar waveguide echelle gratings.

2. Description of Related Art

In wavelength division multiplexing an incoming light beam must be demultiplexed into its component channels. A device suitable for achieving this is a planar waveguide echelle grating. This consists of a slab waveguide providing an input channel and a plurality of output channels and an echelle diffraction grating etched into a wafer which diffracts the incoming light toward the output channels according to wavelength $\lambda$. The echelle grating is typically "blazed", which means that the reflecting facets are tilted at an angle $\theta$ relative to the normal to the grating. The blaze angle is chosen so that the light is diffracted predominantly into the higher orders where the resolution is greater. The blaze angle is optimized for a particular wavelength or channel in a particular order, and this is known as the blaze channel.

It is also advantageous if the grating is based on a Rowland circle design. In such a design the grating facets are arranged along an arc having a radius of curvature R. The diffracted rays come to a focus at points on a circle whose diameter D is equal to the radius of curvature R of the arc along which the grating facets are arranged. Geometric analysis shows that this is true provided the size of the grating is small compared to the diameter of the circle.

In such gratings, the facets are either straight or circular. Interference/phase errors along a facet for a given wavelength may lead to focusing of the input on the output channel with aberrations. This becomes a serious problem when the order or size of the grating is larger and the channel count becomes very high. Depending upon the size of the facets, non-perfect focusing may also lead to diffraction in many orders and eventually into high insertion loss at the required order.

The aberrations due to astigmatic effects lead to imperfect focusing of the grating with phase errors resulting in unacceptable cross talk in high resolution gratings.

SUMMARY OF THE INVENTION

According to the present invention there is provided a planar waveguide grating device, comprising a slab waveguide defining an input channel and a plurality of output channels; and an echelle grating having a multitude of facets, each of said facets being blazed with respect to a preselected channel position, and each facet having an elliptical curvature so as to be astigmatic with respect to the input channel and said preselected channel position.

The facets are preferably arranged such that the input and output channels lie on a Rowland circle.

In this specification it will be understood that the expression echelle grating is used to cover any "staircase" like grating, including, echelle, echellette, and echelon gratings. The facets are designed such that the input channel and preselected channel lie at the foci of a ellipse following the curvature of the facets. This design leads to substantially aberration free imaging of the input.

The echelle grating is preferably designed to operate in high orders, for example, at least the $20^{th}$ order, and preferably greater than the $450^{th}$ order, for example the $471^{st}$ order.

In another aspect the invention also provides a method of making a planar waveguide grating device, comprising the steps of providing a slab waveguide defining an input channel and a plurality of output channels; and forming an echelle grating having a multitude of facets, each of said facets being blazed with respect to a preselected output channel, and providing each facet with an elliptical curvature so that it is astigmatic with respect to the input channel and said preselected output channel.

The invention also enables the design of an echelle grating with different groups of facets astigmatically blazed with respect to different preselected output channels.

BRIEF DESCRIPTION OF THE DRAWINGS

The invention will now be described in more detail, by way of example only, with reference to the accompanying drawings, in which.

DETAILED DESCRIPTION OF THE PREFERRED EMBODIMENTS

Figure 1:
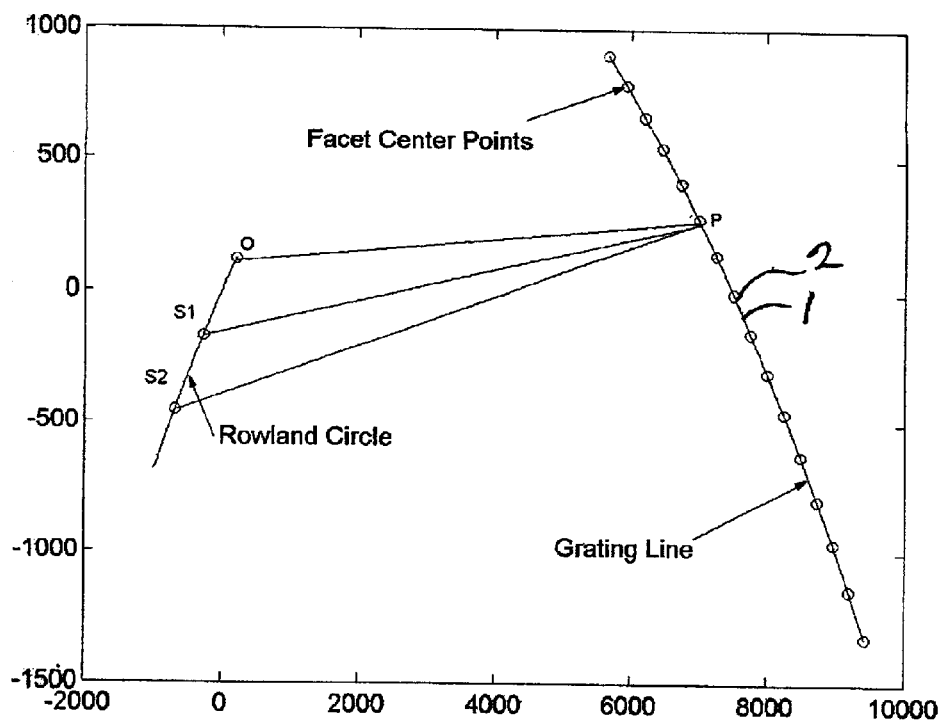
FIG. 1 is a schematic view of an echelle grating based on a Rowland circle.
Figure 2:
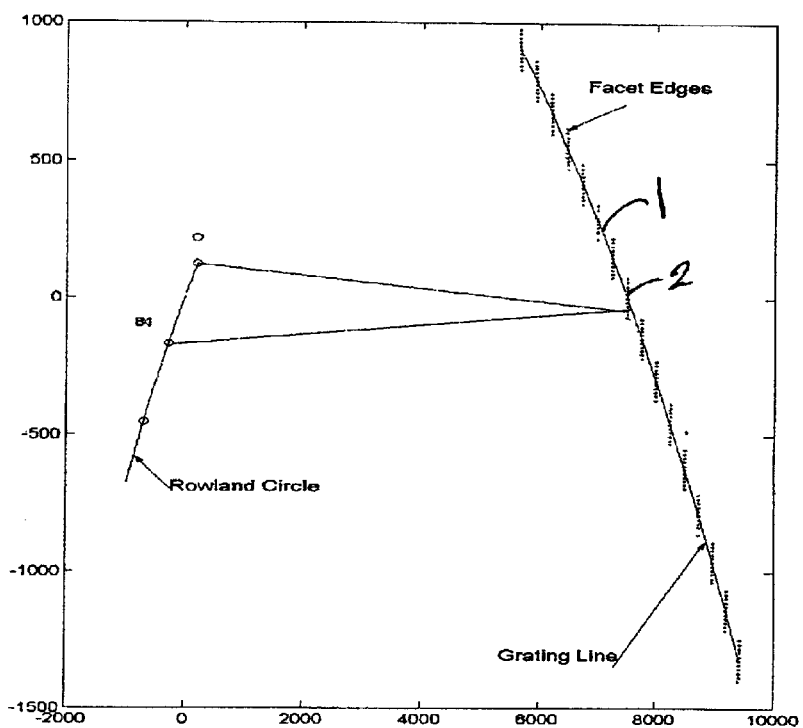
FIG. 2 is a schematic view of an echelle grating with astigmatic facets.
Figure 3:
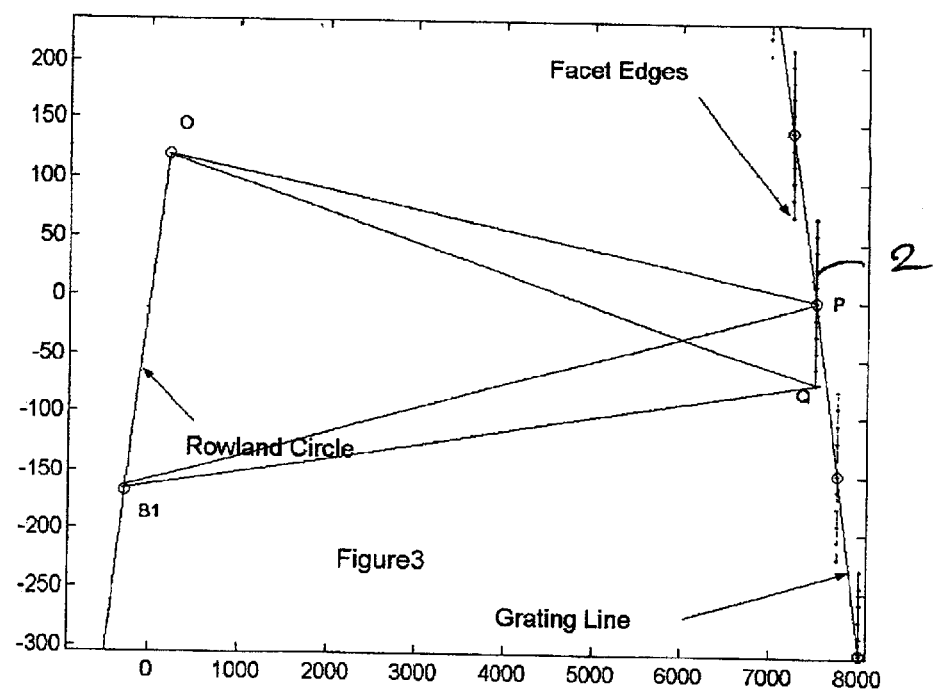
FIG. 3 is a close up view of the facets shown in FIG. 2.

The units shown along the ordinate and abscissa axes in FIGS. 1 to 3 are in microns.

The Echelle grating in accordance with the principles of the invention is designed based on the double astigmatic design. Such a grating is described in Reinhard Marz, 'Integrated Optics: Design and Modeling', Artech House Inc., Norwood, Mass., 1995, Section 8, the contents of which are herein incorporated by reference.

As shown in FIG. 1 the input O and outputs S1 and S2 are located on the Rowland circle. The grating line 1 along which the grating facets 2 are arranged is close to an arc with radius of curvature equal to twice that of Rowland circle. In other words the Rowland circle has a diameter equal to the radius of curvature of the line 1. Simple geometry shows that in such an arrangement, the light from the input O is brought to a focus on the Rowland circle, see, for example, Optics and Photonics, Graham Smith and Terry King, Wiley, 2000, the contents of which are herein incorporated by reference.

In the FIG. 1, O is the input channel while S1 and S2 are output channels. The center positions P of the grating facets 2 are determined in such a way that they are astigmatic with reference to two stigmatic points S1 and S2 at wavelengths $\lambda_1$ and $\lambda_2$, respectively.

This is obtained by using the relationships $$<O,P>+<P,S1>-(<O,Pc>+<Pc,S1>)=(n+m)\lambda_1 \text{ and}$$

$$<O,P>+<P,S2>-(<O,Pc>+<Pc,S2>)=(n+m)\lambda_2.$$

where, n is an integer, m is the order of the grating. <z1,z2> refers the distance between the points z1 and z2. Pc is the center of the Rowland Grating.

In other words, the point P is the intersection of the two ellipses with foci at (O, S1) and (O, S2). All the facet center points can be obtained by changing different 'n' values. This double astigmatic design of grating facet center ensures relatively aberration free images at S1 and S2, although higher order aberrations will occur due to the straight facets.

In accordance with the principles of the invention, once the facet center positions are determined, the reflecting facet edges are designed in such a way that all the facets are blazed with respect to a preselected output channel, B1 in a given order as shown in FIG. 2. The channel B1 can be selected depending upon the non-uniformity requirement. The relative positioning of the blazing channel with respect to all the output channels determines the non-uniformity and symmetry. The variation of the insertion loss along the output channels, for example, the blazing channel is selected close to the channel 24 for a channel for a 48 channel demux so that the non-uniformity in the insertion loss will be symmetric with respect to the channel 24 and minimum for the entire channels. In an application with high channel count, it is possible to astigmatically blaze different groups of facets with respect to different blazing channels so the non-uniformity is suitably manipulated.

A close up view of the facets 2 is shown in FIG. 3. The facets edges are designed such that the entire facet 2 is astigmatic with reference to a selected blazing channel B1. It follows the following condition that, any point Q, on the facet with facet center P on the grating line, should satisfy $$<O,Q>+<Q,B1>=<O,P>+<P,B1>$$

In other words, each facet edge will be part of an ellipse with foci at O and B1. The Rowland grating design disperses the image of the input along the Rowland circle depending upon the wavelength.

Figure 4:
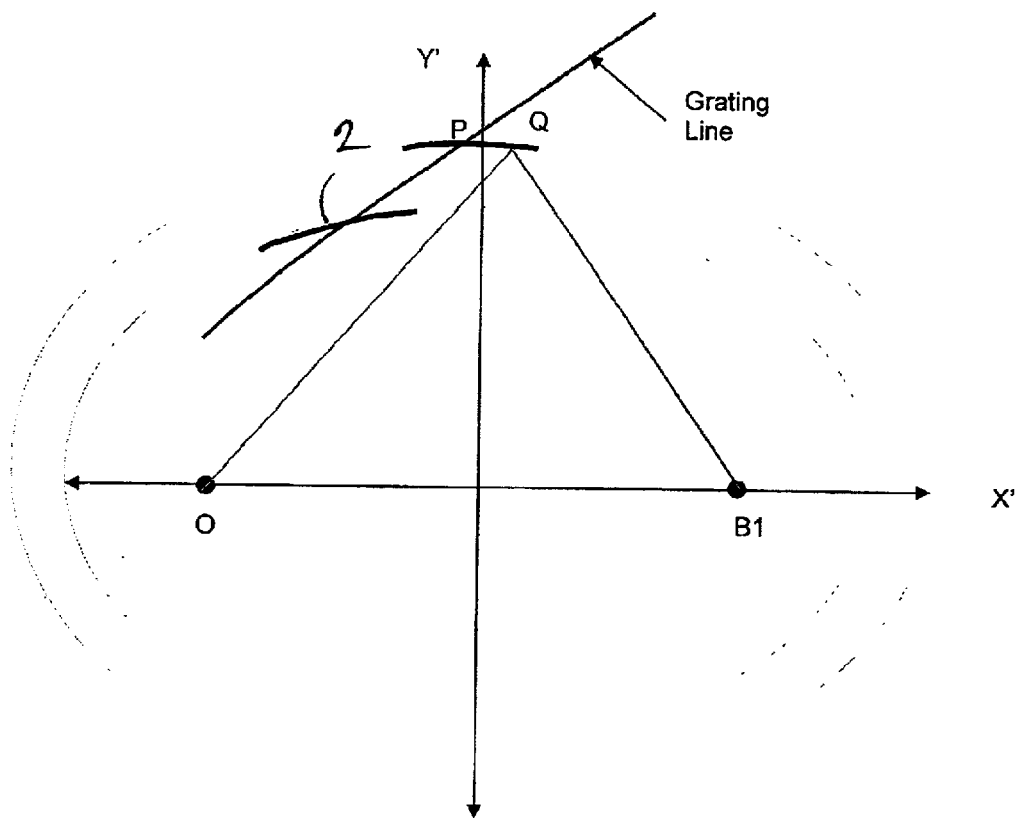
FIG. 4 shows the geometry of the facet design in accordance with the principles of the invention.

The facets 2 are shown in FIG. 4 in a new coordinate system of X' and Y'. The coordinates along each facet edge is estimated using the following equation $$\frac{X'^2}{\left[\frac{<O,Q>+<Q,B1>}{2}\right]^2} + \frac{Y'^2}{\left[\frac{<O,Q>+<Q,B1>}{2}\right]^2 - \left[\frac{<O,B1>}{2}\right]^2}.$$

Whenever the facet geometry departs from the astigmatic elliptic shape, it results in aberrations which could affect the performance severely depending upon the size of the facets in relation to the wavelength.

In order to demonstrate the advantages of the present astigmatic design of grating facets, the results are compared with that of Echelle grating with straight facets that point to a common blaze point.

In this example a Demux with order=20 has been selected in order to study the effect of blazing with different facet geometry (straight or elliptic). All the facets are ideally (refractively) astigmatized with reference to channel 24 using elliptic facets in one case and the facets are reflectively astigmatized with reference to channel 24 using straight facets in the other case. The facet size varies from about 4.8 to 7.4 μm.

Figure 5:
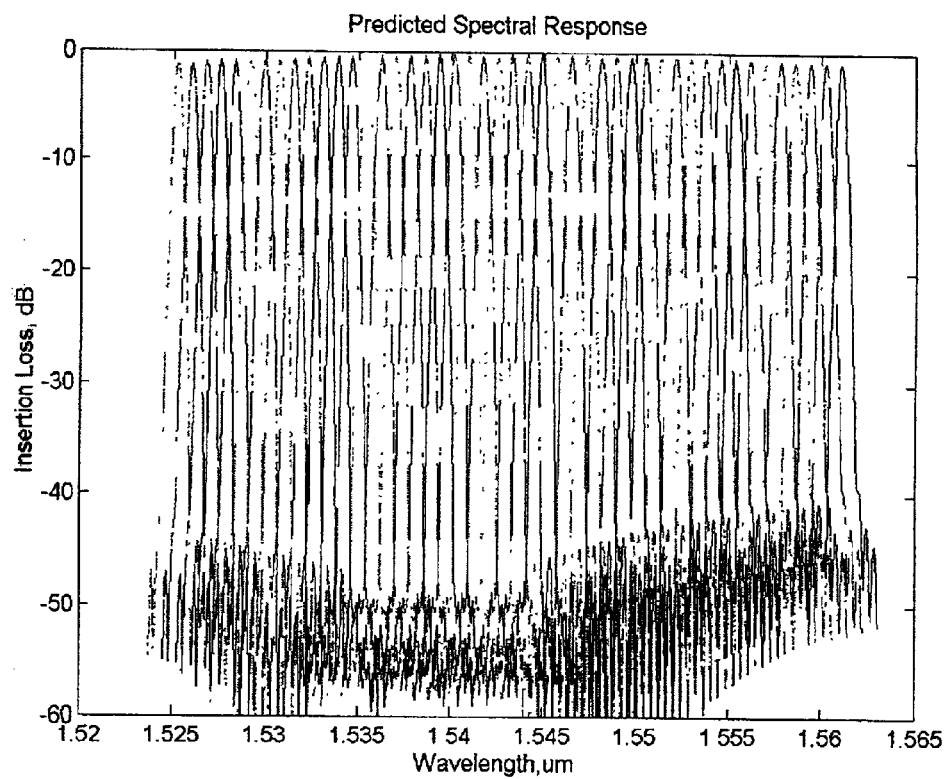
FIG. 5 shows the spectral response of a grating with straight facets.

FIG. 5 shows the spectral response for straight facets. This shows an increase in the background cross talk at the end channels compared to the center. It is due to the phase errors introduced due to the straight facets.

Figure 6:
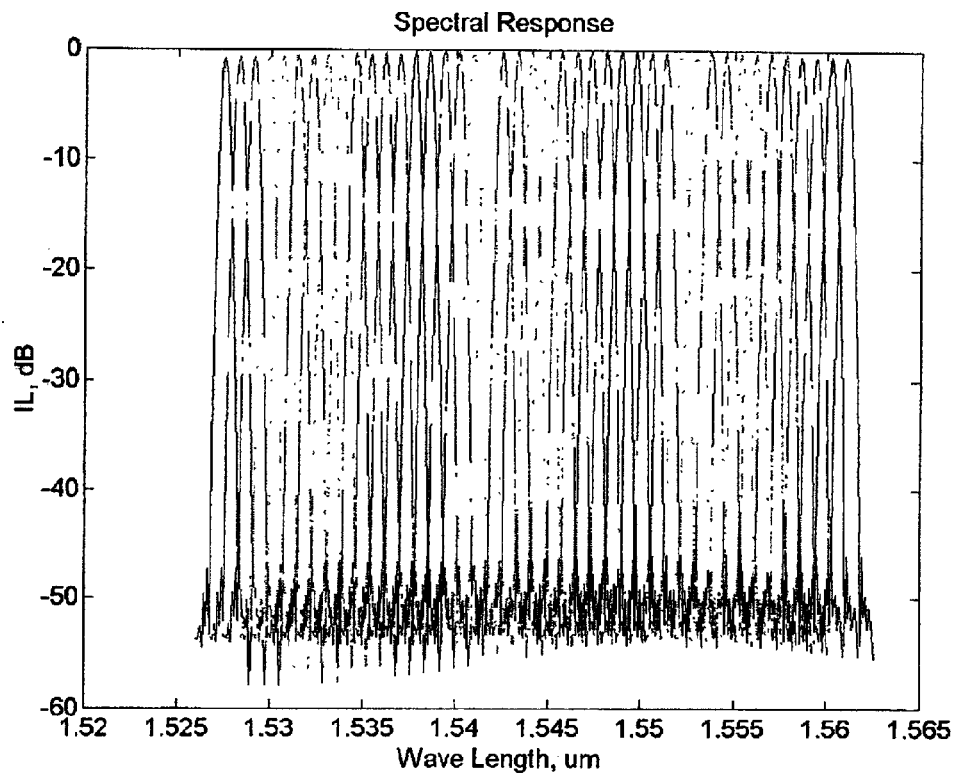
FIG. 6 shows the spectral response of a grating with elliptical facets.

The FIG. 6 shows the performance with elliptic facets in accordance with the principles of the invention. It will be observed that the response is symmetric for all the channels and the background cross talk remains the same for all the channels.

Figure 7:
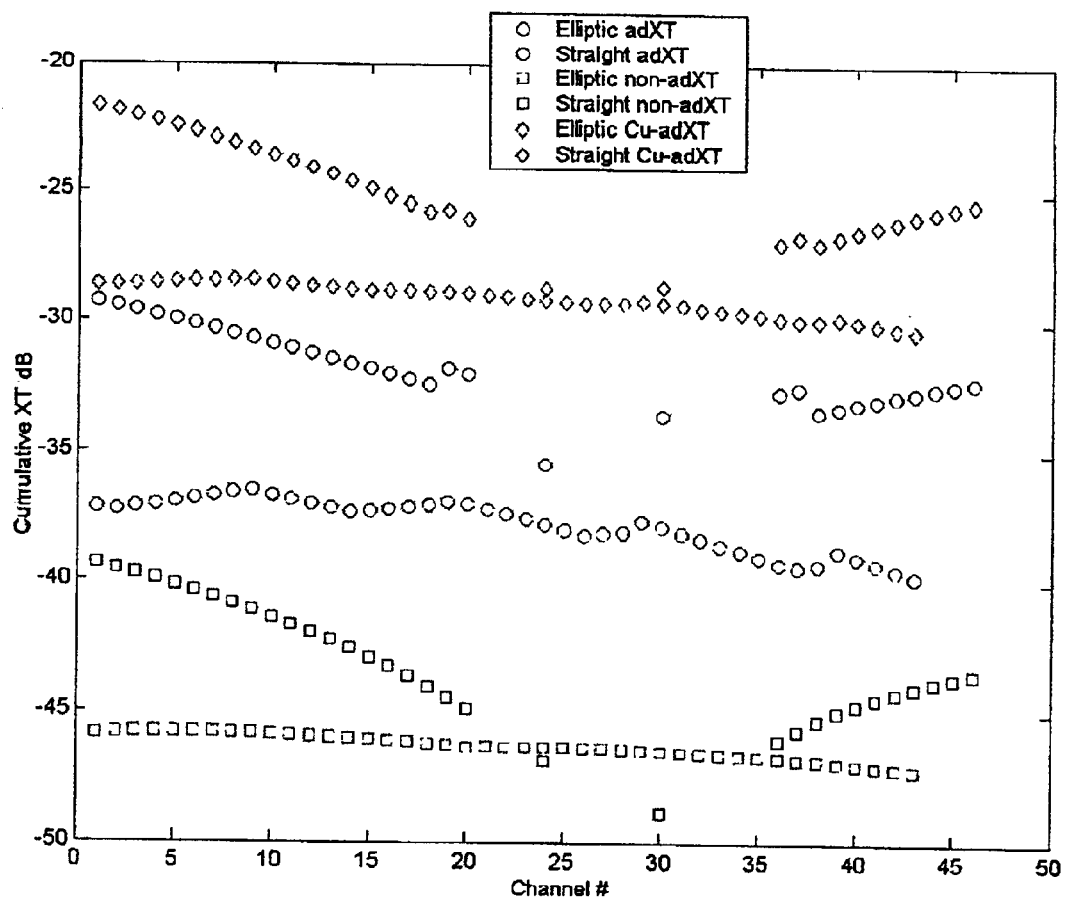
FIG. 7 compares the cross talk performance of a demux with elliptic and straight facets.

The FIG. 7 compares the cross talk performance of the demux with elliptical and straight facets. The cross talk is uniformly better for all the channels for the elliptic facets compared to straight facets. An improvement of around 5 dB in cross talk at the end channels is observed for elliptic facets.

Figure 8:
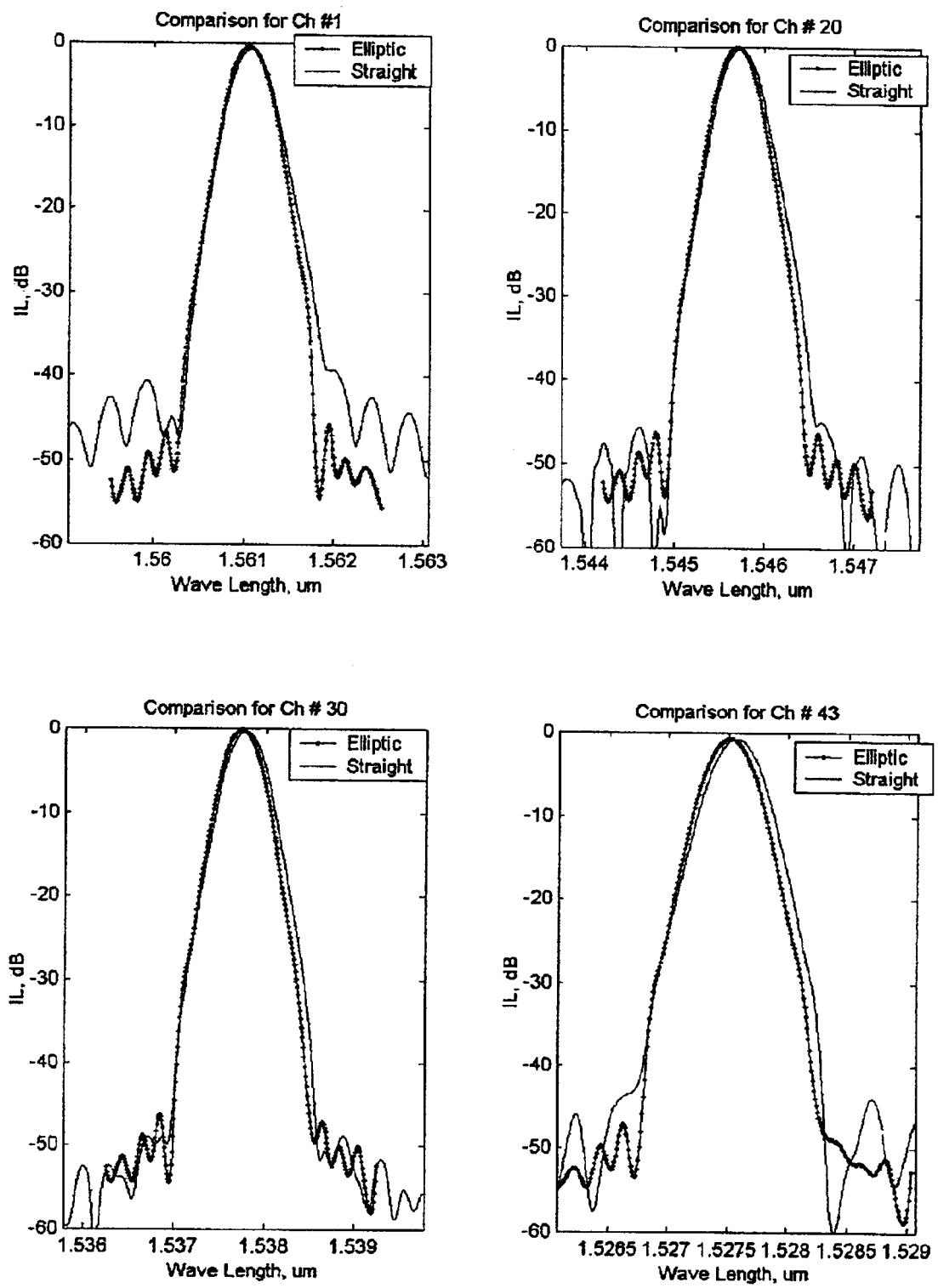
FIG. 8 shows the spectral response for both straight and elliptical facets for channels 1, 20, 30, and 43.

The FIG. 8 shows the spectral response for both straight and elliptic facets for the channels 1, 20, 30 and 43 of a demultiplexer incorporating a grating in accordance with the invention. It can be inferred from this figure that spectral response is uniform for all the channels and background is lower for astigmatic facets.

Figure 9:
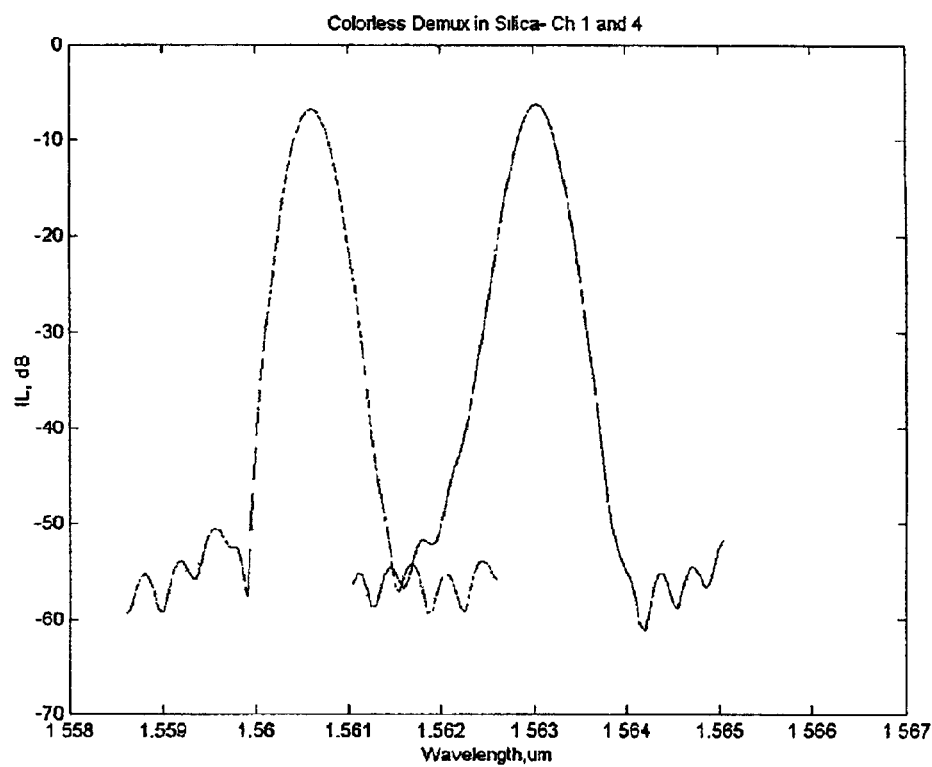
FIG. 9 shows the predicted spectral response for an echelle grating with order 471 and 16 straight facets.

The predicted spectral response with straight facets is shown in FIG. 9 for Echelle grating with order=471 and with 16 facets, and with a facet size of about 150 μm. Very high losses and unsymmetrical spectral response are observed with reference to the center wavelength due to aberrations introduced by straight facets.

Figure 10:
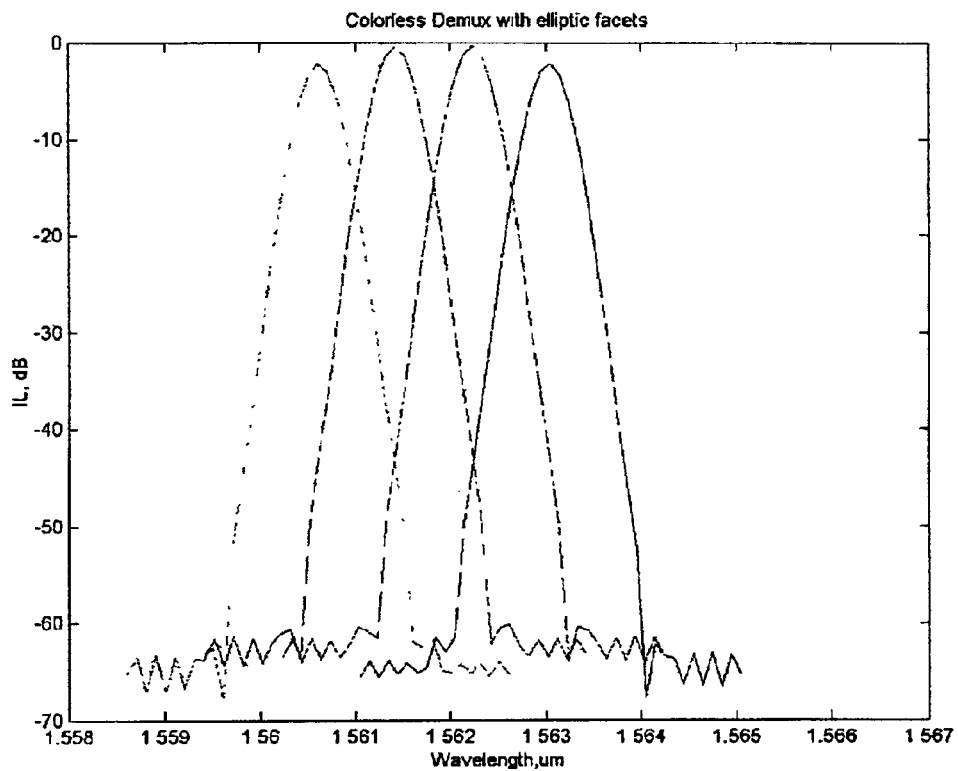
FIG. 10 shows the spectral response for channels 1, 2, 3, and 4 for an echelle grating with elliptic facets.

The spectral response for the channels 1,2,3 and 4 is shown in FIG. 10 for elliptic facets The elliptic facets shows highly reduced the insertion loss, increased the isolation and made the response highly symmetric.

It will thus be seen that for medium order gratings, the elliptic facets improve the background and reduce the cross talk by 5 dB for extreme channels, improve the symmetry of the spectral response for all the channels, and result in background and cross talk independent of the channel position. (This is very important when we go for high channel counts. The increase in background at channels away from the center channel may become unacceptably high when the number of channels is very large (Refer FIG. 5). In such cases elliptic facets will be very useful as the background is channel independent).

For very high order grating, the elliptic facets result in reduced losses by eliminating the diffraction in other orders, very low background and cross talk (The non-adjacent cross talk is in the range of −58.44 dB), and very symmetric spectral response.

The planar device will be typically formed on a silicon wafer using conventional fabrication techniques.

The present invention has important applications in the field of wavelength division multiplexing or demultiplexing, wavelength independent aberration free focusing of the input is very important in order to achieve very low cross talk and channel independent spectral response.

We claim:

1. A planar waveguide grating device, comprising:
   an input channel and a plurality of output channels; and
   an echelle grating having a multitude of facets, each of said facets being blazed with respect to a pre-selected output channel position, and said facets each having an elliptical curvature and lying on an arc of a series of respective ellipses having a first focal point at said input channel and a second focal point at said pre-selected output channel position, whereby said facets are astigmatic with respect to said input channel and said pre-selected output channel position.

2. A planar waveguide grating device as claimed in claim 1, wherein different groups of facets are blazed with respect to said input channel and different pre-selected output channel positions, and said facets within each group are astigmatic with respect to said pre-selected output channel position associated with that particular group.

3. A planar waveguide grating device as claimed in claim 1, wherein said facets are arranged such that the input and output channels lie on a Rowland circle.

4. A planar waveguide grating device as claimed in claim 1, wherein said echelle grating is configured to operate in at least the $20^{th}$ order.

5. A planar waveguide grating device as claimed in claim 1, wherein said echelle grating is configured to operate in at least the $450^{th}$ order.

6. A method as claimed in claim 1, wherein said pre-selected output channel position is common to all said facets.

7. A method of making a planar waveguide grating device, comprising:
  defining an input channel and a plurality of output channels; and
  forming an echelle grating having a multitude of facets, each of said facets being blazed with respect to a pre-selected output channel position, and providing said facets with an elliptical curvature lying on an arc of a series of respective ellipses having a first focal point at said input channel and a second focal point at said preselected output channel position whereby said facets are astigmatic with respect to the input channel and said preselected output channel position.

8. A method as claimed in claim 7, wherein said facets are located such that said input and output channels lie on a Rowland circle.

9. A method as claimed in claim 7, wherein said echelle grating is configured to operate in at least the $20^{th}$ order.

10. A method as claimed in claim 7, wherein said echelle grating is configured to operate in at least the $450^{th}$ order.

11. A method as claimed in claim 10, wherein said echelle grating is fabricated on a silicon wafer.

12. A method as claimed in claim 7, wherein said pre-selected output channel position is common to all said facets.

13. A method as claimed in claim 7, wherein different groups of facets are blazed with respect to said input channel and different preselected output channel positions, and said facets within each group are astigmatically blazed with respect to said preselected output channel position associated with that particular group.

14. A planar waveguide grating device, comprising:
  an input channel and a plurality of output channels lying, said input and output channels lying on a Rowland circle; and
  an echelle grating having a multitude of facets, each of said facets being blazed with respect to a preselected output channel position, and said facets each having an elliptical curvature and lying on an arc of a series of respective ellipses having a first focal point at said input channel and a second focal point at said preselected output channel position, whereby said facets are astigmatic with respect to said input channel and said preselected output channel position.

15. A planar waveguide grating device as claimed in claim 14, wherein said preselected output channel position is common to all said facets.

16. A planar waveguide grating device as claimed in claim 14, wherein different groups of facets are blazed with respect to said input channel and different pre-selected output channel positions, and said facets within each group are astigmatic with respect to said pre-selected output channel position associated with that particular group.

17. A planar waveguide grating device as claimed in claim 14, wherein the facet size lies in the range 4.8 to 7.4 $\mu$m.

* * * * *